April 14, 1959  O. D. HITT ET AL  2,881,589
PNEUMATIC DRILL

Filed June 25, 1956  4 Sheets-Sheet 1

INVENTORS.
OTIS D. HITT and
R. STANFORD SHORT
BY Bair, Freeman & Molinare
ATTORNEYS

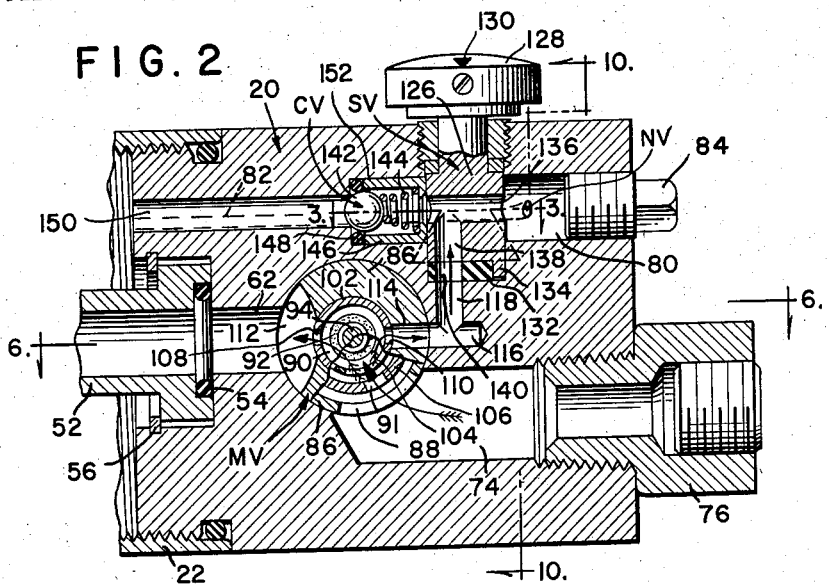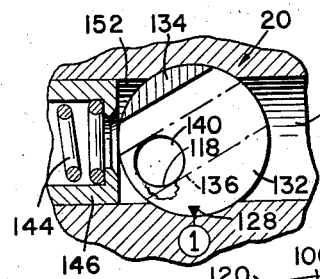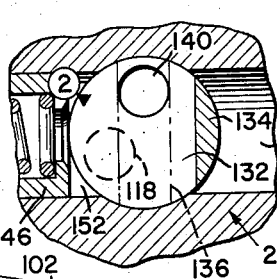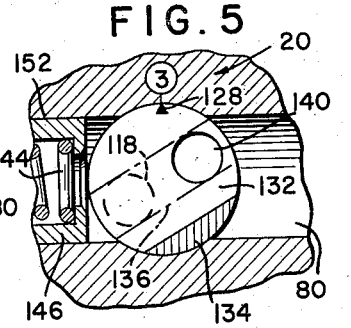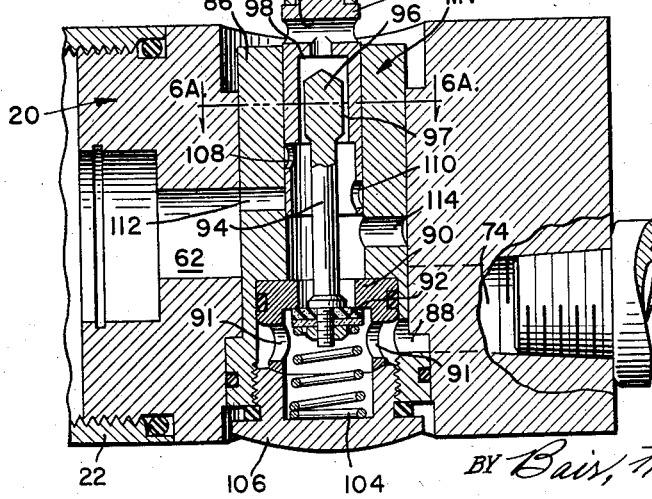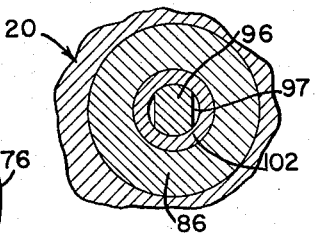

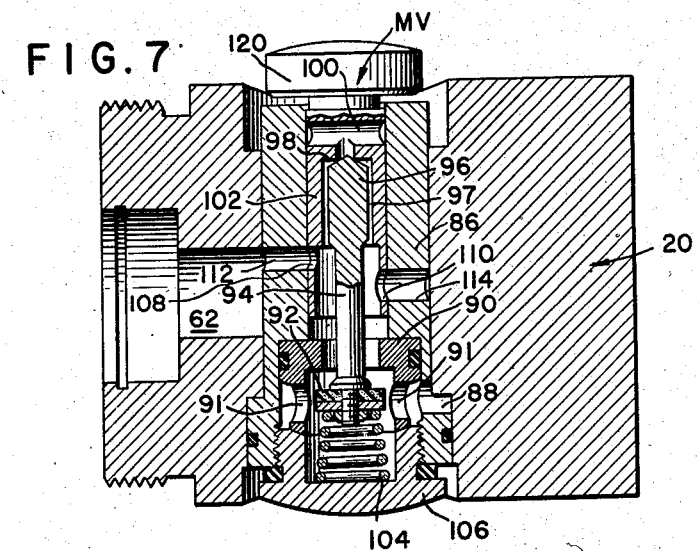
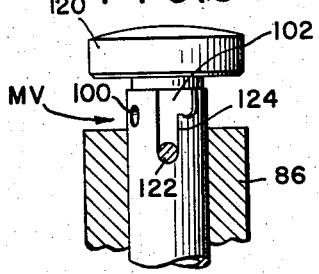
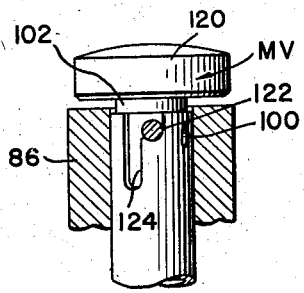

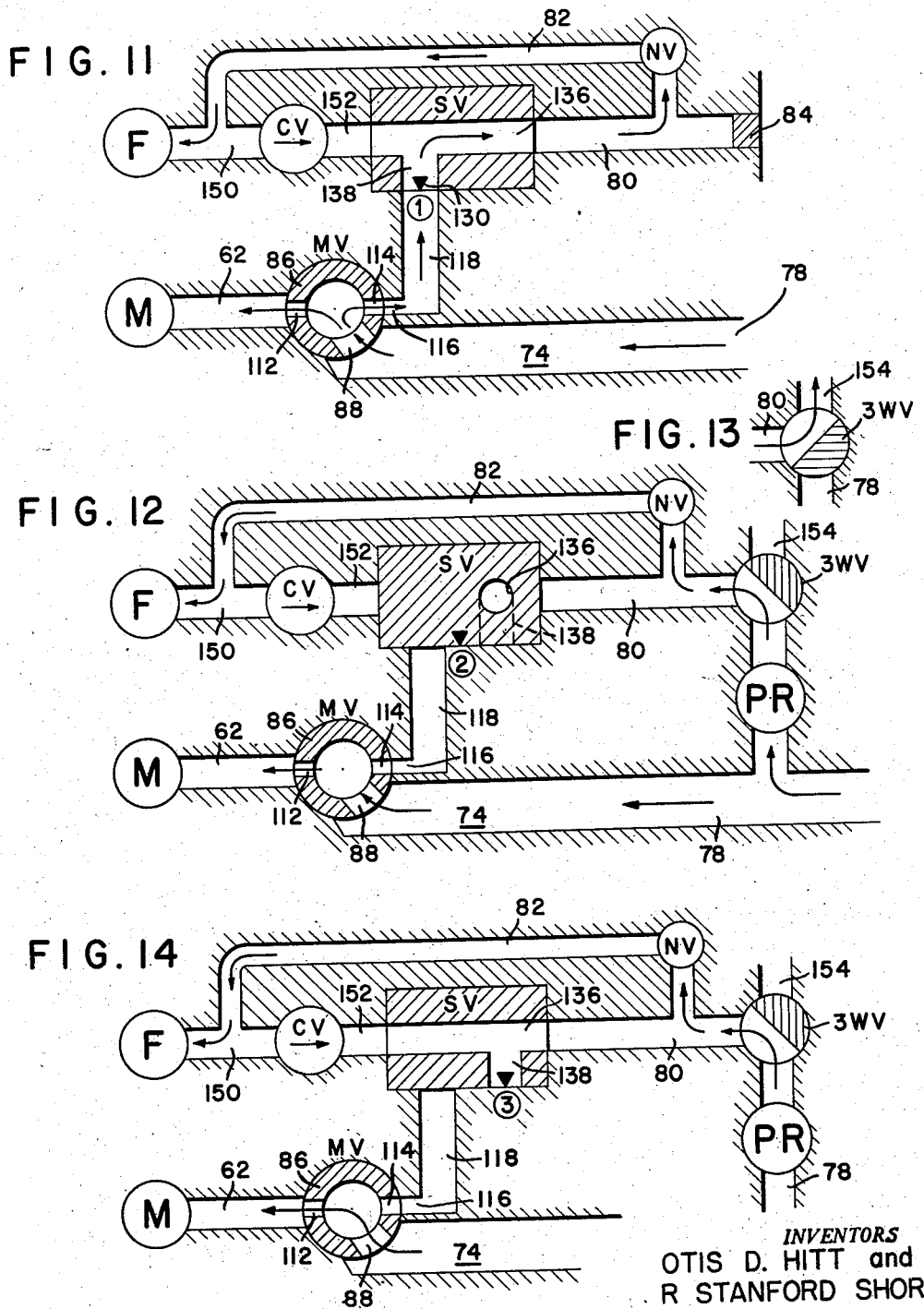

United States Patent Office 2,881,589
Patented Apr. 14, 1959

2,881,589

PNEUMATIC DRILL

Otis D. Hitt and R Stanford Short, Bryan, Ohio, assignors to the ARO Equipment Corporation, Bryan, Ohio, a corporation of Ohio Application June 25, 1956, Serial No. 593,579

17 Claims. (Cl. 60—97)

This invention relates to a fluid operated tool such as a drill wherein the drill chuck is driven by a fluid operated motor and feed means for the drill bit with respect to the work is fluid operated, the fluid being preferably but not necessarily compressed air.

One object of the invention is to provide a simple spring-returned drill, capable of economic production, and a head on the drill in which valve components are mounted and capable of operation in a number of different ways to secure:

(1) Controlled rate of advance and rapid retraction of the drill bit, thrust on the drill bit being a direct function of the air pressure supplied to the motor.

(2) Controlled thrust on the drill bit in the forward direction independent of air pressure to the motor, with controlled rate of advance and retraction of the drill bit.

(3) Controlled thrust on the drill bit independent of air pressure supplied to the motor and controlled rate of advance, with rapid retraction of the drill bit.

The control as outlined in (2) and (3) is achieved partially by remote accessories and partially by the incorporated valve components which components may comprise a main valve, a selector valve and a rate-of-flow valve in various combinations.

Another object is to provide a fluid operated drill which is adapted for various types of operation either under control of a main valve mounted thereon or under the control of a separately mounted (remotely if desired) control valve which may or may not be associated with a pressure regulator so as to control the thrust of the drill or not, as desired.

Still another object is to provide a rate-of-control valve such as a needle valve or restricted orifice in the drill head for controlling the rate of feed of the drill bit and also the rate of retraction thereof if desired.

A further object is to provide the inclusion of a one-way valve such as a check valve in the line to the pneumatic feed of the drill in such manner that the air cannot pass through the check valve during the feeding of the drill bit but instead is controlled by the needle valve for controlling the rate of advance, yet when the drilling operation is completed and the control valve is returned to its initial position, fast return of the drill is had by reason of quick passage of return air from the feed cylinder through the one-way or check valve.

With these and other objects in view, our invention consists in the construction, arrangement and combination of the various parts of our pneumatic drill, whereby the objects above contemplated are attained, as hereinafter more fully set forth, pointed out in our claims and illustrated in detail on the accompanying drawings, wherein:

Fig. 2 is an enlarged vertical sectional view on the line 2—2 of Fig. 1A and shows particularly details of a main valve and a selector valve and the passageways communicating therewith;

Fig. 3 is a horizontal sectional view on the line 3—3 of Fig. 2 showing one position of the selector valve;

Figs. 4 and 5 are similar views showing other positions of the selector valve;

Fig. 6 is a horizontal sectional view on the line 6—6 of Fig. 2 showing the normal position of the main valve;

Fig. 6A is a detailed sectional view on the line 6A—6A of Fig. 6;

Fig. 7 is a sectional view similar to Fig. 6 showing the main valve in depressed position;

Fig. 8 shows a side elevation of the upper end of the main valve and adjacent portions of the drill head in section, the valve being in the normal position;

Fig. 9 is a similar view showing the valve locked in depressed position;

Fig. 10 is a vertical sectional view on the line 10—10 of Fig. 2;

Fig. 11 is a diagrammatic view showing our pneumatic drill with pneumatic connections thereto for operating the drill in one manner with the selector valve in the position of Fig. 3 and the main valve depressed to the "on" position;

Fig. 12 is a similar diagrammatic view showing the addition of a pressure regulator and a three-way valve to the pneumatic drill as disclosed in Figs. 1 to 11, either as separate and remote units or as part of the drill, for a different type of operation, the selector valve being in the position of Fig. 4 and the main valve locked in the "on" position;

Fig. 13 is a diagram of the three-way valve of Fig. 12 in non-operating position; and Fig. 14 is a diagram similar to Fig. 12 except showing the selector valve in the position of Fig. 5 and the main valve locked in the "on" position.

Figure 1:
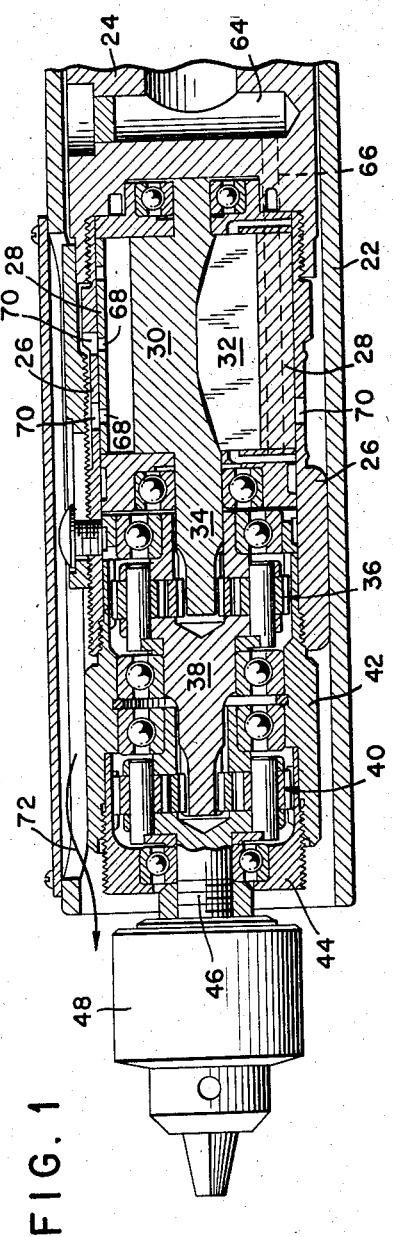
Fig. 1 is an axial horizontal sectional view through the front half of a pneumatic drill embodying our invention, the drill chuck being shown in plan view.

On the accompanying drawings we have used the reference numeral 20 to indicate in general a drill head from which a tubular housing 22 extends. The housing also constitutes a feed cylinder as will hereinafter appear.

A piston rod 24 of tubular character is slidable in the housing 22 and at its forward end as shown in Fig. 1 has a tubular motor casing 26 screw-threadedly connected therewith. The casing 26 is slidable along the interior surface of the housing 22. Within the motor casing 26 is a stator 28 and a rotor 30 of a pneumatic motor of the vane type, one of the vanes being shown at 32. A motor shaft 34 extends from the rotor 30.

Planetary gearing 36 connects the motor shaft 34 with an intermediate shaft 38 which coacts with a second set of planetary gears 40. An extension casing 42 is threadedly connected with the motor casing 26 and supports the gearing 36 and 40 just referred to and a bearing support 44 which is threaded therein to support a chuck shaft 46. The shaft 46 is rotated at reduced speed relative to the motor shaft 34 by the planetary gearing 36 and 40. A drill chuck 48 is mounted on the chuck shaft 46 for operation by the pneumatic motor 28—30—32.

Figure 1A:
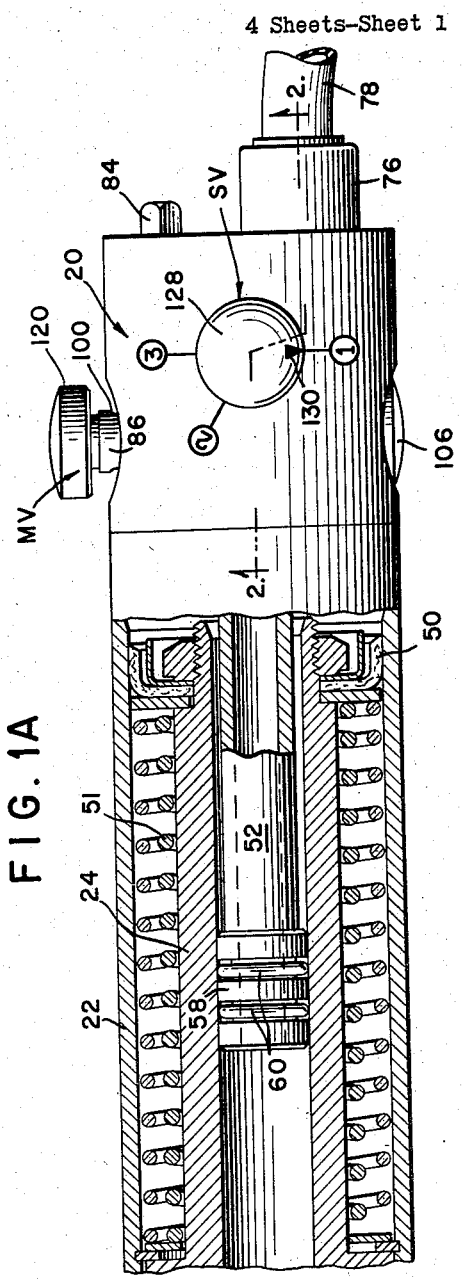
Fig. 1A is a similar part sectional and part plan view of the rear half thereof.

A feed piston 50 is secured to the right-hand end of the piston rod 24 as shown in Fig. 1A and coacts with the feed cylinder 22 so that air admitted to the right side of the feed piston will drive the entire assembly represented by the reference numerals 24 through 50 toward the left against the action of a pair of return springs 51 thus feeding the drill into the work. When the air is exhausted from the feed cylinder, the return springs 51 will return the assembly 24—50 to the position illustrated in Figs. 1 and 1A.

A motor air supply sleeve 52 is connected with the drill head 20 as shown in Fig. 2 by a retainer ring 56 and sealed relative thereto by an O-ring 54. The left-hand end of the sleeve 52 terminates in a head 58 as shown in Fig. 1A which has a pair of grooves receiving O-rings 60 for sealing purposes between the sleeve 52 and the internal diameter of the piston rod 24.

The sleeve 52 communicates with a motor port 62 as shown in Fig. 2 and this communication is carried through Fig. 1A and into Fig. 1 through the piston rod 24 which terminates in a cross hole 64 that communicates by means of an inlet port 66 with the motor 28—30—32. The motor has exhaust ports 68 in its stator 28 communicating through exhaust ports 70 of the motor casing 26 to the space therearound in the tubular housing 22, finally discharging adjacent the chuck end of the drill as indicated by the arrow 72 in Fig. 1.

The drill head 20 is provided with a main air supply port 74 and a main valve MV is interposed between the ports 62 and 74 to control the supply of air from 74 to 62. The main valve will be described later. An air supply fitting 76 is mounted in the port 74 and a source of air supply 78 such as a hose 78 shown in Fig. 1A may be connected therewith.

An auxiliary air supply port 80 (see Fig. 2) is provided in the drill head 20 which connects with a feed port 82 extending to the space in the feed cylinder 22 between the left-hand end of head 20 and the feed piston therein. Our pneumatic drill may be operated in a number of different ways and one of these ways requires that the port 80 be plugged as at 84 in Fig. 2. As shown in Fig. 10, a restricted orifice is provided in the form of a needle valve NV which chokes the flow of air from 80 to 82 and is adjustable to vary the degree of choking and thereby the rate of advance of the drill through the work as will be described later.

The main valve MV comprises a sleeve 86 mounted stationarily in the drill head 20 and having an inlet port 88 communicating with the main air supply port 74. An inlet valve seat 90 is mounted in the sleeve 86 and has ports 91 to conduct air from the port 88 to the interior of the valve seat 90 below the seat thereof. An inlet valve 92 is normally seated on the seat 90 by a return spring 104 seated in a closure cap 106 therefor. A stem 94 extends upwardly from the inlet valve 92 and terminates in an exhaust valve 96 having flat sides 97 for the passage of exhaust air. The exhaust valve 96 is adapted to coact with an exhaust valve seat 98 formed in a valve plunger 102 and the seat 98 communicates with an exhaust port 100 of the valve plunger.

The valve plunger 102 has a motor port 108 and a feed port 110. The sleeve 86 has a motor port 112 and a feed port 114 adapted at times to coact with the ports 108 and 110 respectively (see Fig. 7). The port 114 communicates with a passageway 116 leading to a selector valve port 118. The valve plunger 102 is provided with a control knob 120 whereby the main valve may be depressed from the position of Fig. 6 to the position of Fig. 7 when desired.

The main valve MV may also be locked in the position of Fig. 7 as shown in Fig. 9, this being accomplished by means of a bayonet pin 122 extending inwardly from the sleeve 86 into a bayonet slot 124 of the valve plunger 102. The normal or "off" position of the main valve is illustrated in Fig. 8 whereas the "on" position thereof is illustrated in Fig. 9 with the knob 120 rotated clockwise from the Fig. 8 position to the Fig. 9 position for effecting the locking action just referred to as between the bayonet pin and the bayonet slot.

The selector valve SV is of the plug type, the plug being indicated at 126, and is provided with a control knob 128 having an index 130 thereon. This index is adapted to indicate three positions of the valve, (1), (2) and (3) as shown in Fig. 1A and diagrammatically in Figs. 3, 4, 5, 11, 12 and 14. A seal disc 132 is provided against the lower surface of the plug 126 and seats against the selector valve port 118, there being a projection 134 from the valve plug to cause rotation of the sealed disc 132 with the valve plug 126 and relative to the bottom of the socket in which the plug is mounted.

The valve plug 126 is provided with a cross port 136. An end port 138 communicates therewith and coincides with an end port 140 in the seal disc 132. In position (1) of the selector valve SV as shown in Figs. 2, 3 and 11, the ports 140 and 118 are in registry whereas in position (2) they are not in registry as illustrated in Figs. 4 and 12 and likewise are not in registry when in position (3) illustrated in the Figs. 5 and 14.

Referring to Fig. 2, a check valve or one-way valve indicated generally as CV is provided, consisting of a check ball 142 normally seated by a check ball spring 144 against an O-ring seat 148. The spring is contained in a spring cage 146 bearing against the cylindrical surface of the selector valve plug 126 under the bias of the spring and is slidable in a check valve port 152 which is a continuation of the port 80. The port 152 communicates with a feed passageway 150 when the check ball is open, the passageway in turn terminating at the left end of the drill head 20 behind the feed piston 50 the same as the feed port 82 already described.

As shown in Figs. 2, 3 and 11, the cross port 136 of the selector valve SV communicates with the ports 80 and 152 in position (1), and likewise does so in position (3) illustrated in Figs. 5 and 14. When the selector valve is in position (2) of Figs. 4 and 12, however, such communication is blocked off.

PRACTICAL OPERATION

*Figs. 2, 3 and 11—SV in position (1)*

With the selector valve SV in position (1) and the auxiliary air supply port 80 plugged as at 84, our pneumatic drill may be operated with a controlled rate of advance, and a rapid retraction of the drill after the drilling operation. The main valve MV is the manual control valve in this setup, the source of air supply 78 being constant. The main valve may then be depressed from the position of Figs. 6 and 8 to the position of Figs. 2, 7, 9 and 11 (and if desired, locked in the depressed position as in Fig. 9 although ordinarily such locking is dispensed with and instead the main valve is held down until such time as retraction of the drill is desired whereupon the knob 120 of the main valve may be released and the return spring 104 will return the valve from the position of Fig. 7 to the position of Fig. 6). Referring to Fig. 11, it will be noted that air from 78 passes through 74 and through the main valve to both the motor port 62 and the selector valve SV. Thus air is supplied to the motor 28, 30, 32 (indicated M) for rotating the drill chuck and simultaneously through the selector valve and the needle valve NV to the feed piston 50 for effecting a slow pneumatic feed (indicated F) of the drill bit through the work as controlled by the setting of the needle valve NV. The air to the selector valve is blocked against passage to the feed F by the check valve CV which closes against passage of air toward the left therethrough so that the air from the selector valve must go to the feed F by way of the needle valve NV.

When the main valve MV is released from the Fig. 7 position to the Fig. 6 position, air is cut off to the motor M by reason of the port 108 rising out of registry with the port 112 and the air left in the motor M is reduced to atmosphere through its exhaust ports 68 and 70 as indicated by the arrow 72 in Fig. 1 after which the air pressure trapped in the feed cylinder 22 opens the check valve CV and returns through the selector valve SV and the port 114 to the interior of the sleeve 86 where it acts on the valve plunger 102 to elevate it and space its exhaust valve seat 98 from the exhaust valve 96 thereby permitting exhaust of the feed air to atmosphere past the flats 97 of the valve stem 94 and out of the exhaust port 100. The feed piston 50 is then, of course, returned by its springs 51 to its initial position and rapid retraction of the drill bit is effected because of the comparatively free passageway for the exhaust air from F through CV, SV, MV and exhaust port 100 to atmosphere.

*Figs. 4, 12 and 13—SV in position (2)*

In Fig. 12, we illustrate the main valve MV locked in the "on" position by the bayonet connection 122—124 as in Fig. 9 and use a three-way valve 3WV as a control valve with air constantly supplied through the main valve to the motor so that the motor rotates continuously when locked "on" (or intermittently when controlled by manual manipulation on and off of the main valve MV). A pressure regulator PR is interposed in the air supply so that there is controlled thrust of the feed piston 50 in the forward direction due to the presence of the pressure regulator, and a controlled rate of advance and retraction due to the setting of the needle valve NV is had. The three-way valve then acts as a manual control remote from the pneumatic drill. When the valve 3WV is turned "on" as in Fig. 12, air flows through PR, 3WV and NV to F and while the rate of advance is controlled by the needle valve, thrust is controlled by the pressure regulator. When increased resistance to the drilling operation is encountered, feed pressure in the feed cylinder cannot be built up to line pressure due to the presence of the pressure regulator.

When the valve 3WV is turned to the "off" as shown in Fig. 13, the air from F exhausts to atmosphere at 154 and the rate of retraction of the drill bit due to the action of the springs 51 is controlled by the setting of the needle valve NV as the check valve CV is blocked off by the selector valve SV. Thrust is not controlled in both directions but only in the forward direction because PR is not effective when 3WV is in the Fig. 13 position.

*Figs. 5 and 14—SV in position (3)*

When the selector valve is in position (3), our pneumatic drill will have a controlled thrust and rate of advance and a rapid retraction of the drill with rotation of the drill constantly if the main valve MV is locked "on." It will be noted that the supply of air through the pressure regulator PR and the valve 3WV in addition to going through the needle valve NV goes through the selector valve SV to the check valve CV where it is blocked. However, when 3WV is turned to the "off" position of Fig. 13, there is rapid retraction of the drill under the action of the return springs 51 because the check valve opens and permits substantially free flow of air through the port 136 of the selector valve SV to the three-way valve where it exhausts to atmosphere.

If the main valve MV is not locked "on" but is used as a manual control valve, it would be linked to the three-way valve so that for forward feed of the drill bit, NV and 3WV would be in the positions shown in Fig. 14 and during the drill bit retraction, MV would be in the "off" position illustrated in Fig. 6 while 3WV would be in the position illustrated in Fig. 13. The only difference from the operation described in the previous paragraph then would be that the motor is stopped during the retracting operation instead of being constantly driven.

Some changes may be made in the construction and arrangement of the parts of our pneumatic drill without departing from the real spirit and purpose of our invention, and it is our intention to cover by our claims any modified forms of structure or use of mechanical equivalents which may reasonably be included within their scope.

We claim as our invention:

1. A fluid operated drill comprising a fluid operated motor, fluid operated feed means therefor, spring return means for said feed means, and means for controlling said motor and feed means comprising a main valve, a fluid line therefrom to said motor and said feed means for admitting fluid from a source of supply through said main valve to both said motor and said feed means in one position of said main valve and for exhausting fluid from said feed means in another position of said main valve, a rate-of-flow valve in said fluid line between said main valve and said feed means, a check valve shunting said rate-of-flow valve and opening in the return direction from said feed means to control the fluid exhausted from said feed means, and a selector valve having an inlet from the source of fluid supply and outlets to said rate-of-flow valve and said check valve and operable in different positions to render said check and needle valves operable or inoperable.

2. A fluid operated drill comprising a fluid operated motor, fluid operated feed means therefor, spring return means for said feed means, and means for controlling said motor and feed means comprising a main valve, a fluid line therefrom to said motor and said feed means for admitting fluid from a source of supply through said main valve to both said motor and said feed means in one position of said main valve and for exhausting fluid from said feed means in another position of said main valve, a rate-of-flow valve in said fluid line between said main valve and said feed means, a check valve shunting said rate-of-flow valve and opening in the return direction from said feed means to control the fluid exhausted from said feed means, a selector valve having an inlet from the source of fluid supply and outlets to said rate-of-flow valve and said check valve and operable in different positions to render said check and needle valves operable or inoperable, a conduit between said source of fluid supply and said rate-of-flow valve and bypassing said selector valve, and a pressure regulator in said conduit for controlling the thrust exerted by said feed means.

3. A fluid operated drill comprising a fluid operated motor, fluid operated feed means therefor, spring return means for said feed means, and means for controlling said motor and feed means comprising a main valve, a fluid line therefrom to said motor and said feed means for admitting fluid from a source of supply through said main valve to both said motor and said feed means in one position of said main valve and for exhausting fluid from said feed means in another position of said main valve, a rate-of-flow valve in said fluid line between said main valve and said feed means, a check valve shunting said rate-of-flow valve and opening in the return direction from said feed means to control the fluid exhausted from said feed means, a selector valve having an inlet from the source of fluid supply and outlets to said rate-of-flow valve and said check valve and operable in different positions to render said check and needle valves operable or inoperable, a conduit between said source of fluid supply and said rate-of-flow valve and bypassing said selector valve, a pressure regulator in said conduit for controlling the thrust exerted by said feed means, and means in said conduit between said pressure regulator and said rate-of-flow valve for cutting off fluid from said pressure regulator and exhausting fluid from said feed motor through said rate-of-flow valve for controlled retraction of said feed motor.

4. In a fluid operated drill of the character disclosed, a fluid operated motor, fluid operated feed means therefor, spring return means for said feed means, and means for controlling said feed means comprising valve means for admitting fluid to said fluid operated motor and said feed means in one position of the valve and discharging fluid from said feed means to atmosphere in another position of said valve means, a valve for controlling rate of fluid flow from said valve means to said feed means, a check valve shunting said last valve and opening in the return direction from said feed means, and a selector valve for establishing common communication between said check valve, said rate-of-fluid-flow valve and said valve means in one position of said selector valve, for cutting off such common communication in a second position thereof, and for establishing communication between said rate-of-fluid-flow valve and said check valve only in a third position thereof.

5. In a fluid operated drill of the character disclosed, a fluid operated motor, fluid operated feed means therefor, spring return means for said feed means, and means for controlling said feed means comprising valve means for providing or blocking communication of said feed means with a fluid source, a needle valve for controlling the rate of fluid to said feed means, a one-way valve shunting said needle valve and opening in the return direction from said feed means, a selector valve having in a first position thereof, a first communication with said valve means and second and third communications with said one-way valve and said needle valve, said selector valve in a second position thereof cutting off communication with said valve means, a pressure regulator between said fluid source and the connection from said selector valve to said needle valve and a three-way valve controlling flow from said pressure regulator to said connection and from said connection to fluid exhaust.

6. In a fluid operated drill of the character disclosed, a fluid operated motor, fluid operated feed means therefor, spring return means for said feed means, and means for controlling said feed means comprising a control valve for admitting fluid thereto and discharging fluid therefrom, a needle valve for controlling the rate of fluid to and from said feed means, a check valve shunting said needle valve and opening in the return direction from said feed means, and a selector valve operable in one position to connect the outlet side of said check valve to said control valve and in another position to block such connection, and means independent of said control valve to supply fluid to said feed means through said needle valve and from said feed means through said needle valve to exhaust whereby said needle valve controls the rate of flow of fluid both to and from said feed means.

7. In a fluid operated drill of the character disclosed, a fluid operated motor, fluid operated feed means therefor, a spring return means for said feed means, and means for controlling said feed means comprising a main valve for admitting fluid to said motor and said feed means, a rate-of-flow valve for controlling the rate of fluid to and from said feed means, a one-way valve having an inlet connected with said feed means, and a selector valve operable in one position to connect the outlet of said main valve with said rate-of-flow valve and the outlet of said one-way valve, in another position to block off the outlet of said main valve to said rate-of-flow valve and said one-way valve, and in a third position to block off the outlet of said main valve to said feed means but connect the outlet of said one-way valve to said rate-of-flow valve so that they are in shunting relation.

8. In a fluid operated drill, a fluid operated motor, fluid operated feed means therefor, spring return means for said feed means, and means for controlling said feed means comprising a three-way valve for admitting and exhausting fluid to and from said feed means, a needle valve for controlling the rate of fluid to and from said feed means, a check valve shunting said needle valve and opening in the return direction from said feed means, and a selector valve operable to selectively connect said needle valve and said check valve in shunting relation or close off the outlet of said check valve.

9. In a fluid operated drill, a fluid operated motor, fluid operated feed means therefor, spring return means for said feed means, and means for controlling said feed means comprising a three-way valve for admitting fluid to said feed means, a needle valve for controlling the rate of fluid to said feed means, a one-way valve shunting said needle valve and opening in the return direction from said feed means, a selector valve operable to selectively connect said needle valve and said one-way valve in shunting relation or close off the outlet of said one-way valve, and a pressure regulator between the fluid supply and the said feed means.

10. A fluid operated drill of the character disclosed comprising a fluid energized motor, fluid feed means therefor, spring return means for said feed means, and means for controlling said feed means comprising a control valve for admitting fluid thereto and exhausting fluid therefrom, a needle valve for controlling the rate of fluid to said feed means, a check valve for permitting rapid discharge of fluid from said feed means, and a pressure regulator between the fluid supply and said feed means to regulate the pressure through said needle valve to said feed means.

11. In a fluid operated drill, a fluid operated motor, fluid operated feed means therefor, spring return means for said feed means, and means for controlling said motor and said feed means comprising a main valve for admitting fluid to said motor, means for locking said main valve in the open position, a three-way valve for controlling the flow of fluid to and from said feed means, a needle valve and a check valve shunting each other and interposed between said three-way valve and said feed means, said check valve opening toward said three-way valve, and a selector valve interposed between said three-way valve and said check valve for selectively closing off communication between the two or permitting such communication.

12. In a pneumatic drill, a pneumatic motor, pneumatic feed means therefor, spring return means for said feed means, and means to control said feed means comprising a three-way valve for controlling the flow of air to and from said feed means, a needle valve and a check valve shunting each other and interposed between said three-way valve and said feed means, said check valve opening toward said three-way valve, and a selector valve interposed between said three-way valve and said check valve for closing off communication between them or permitting such communication.

13. In a pneumatic drill of the character disclosed, a pneumatic motor, pneumatic feed means therefor comprising a cylinder having a head at one end thereof, a piston in said cylinder and a tubular piston rod extending from said piston in a direction away from said head and carrying said motor, spring return means for said feed means, means for controlling said feed means comprising a control valve, a needle valve interposed between said control valve and said feed means, a check valve shunting said needle valve and opening toward said control valve, and means for supplying air to said motor comprising an air supply tube having one end anchored in said head, extending into said tubular piston rod and having a head on its other end acting as a piston in the bore of said tubular piston rod, said bore communicating with said motor and said first piston surrounding said air supply tube.

14. In a fluid operated drill, a fluid operated motor, fluid operated feed means therefor, spring return means for said feed means, and means for controlling said feed means comprising a needle valve for controlling the rate of fluid to said feed means, a one-way valve shunting said needle valve and opening in the return direction from said feed means, a selector valve operable to selectively connect said needle valve and said one-way valve in shunting relation or close off the outlet of said one-way valve, and a main valve for admitting fluid to said motor and said selector valve, said main valve when open admitting fluid to said motor and said feed means, and when closed shutting off the fluid to said motor and said feed means and also permitting fluid flow from said feed means to atmosphere through said main valve.

15. In a fluid operated drill, a fluid operated motor, fluid operated feed means therefor, spring return means for said feed means, and means for controlling said feed means comprising a three-way valve for admitting fluid to said feed means, a restricted orifice for controlling the rate of fluid to said feed means, a one-way valve shunting said orifice and opening in the return direction from said feed means, a selector valve operable to selectively connect said orifice and said one-way valve in shunting relation or close off the outlet of said one-way valve, and a pressure regulator between the fluid supply and said feed means.

16. In a fluid operated drill, a fluid operated motor, fluid operated feed means therefor, spring return means for said feed means, and means for controlling said feed means and said fluid operated motor comprising valve means having primary porting providing communication from a fluid source to said motor and said feed means when in one position, and when in another position blocking the fluid flow to said motor while permitting flow to said feed means whereby fluid may be discharged from said feed means into said valve means by action of said spring return means, said valve means having secondary porting to permit discharge of the fluid from said feed means to atmosphere in said another position of said valve means.

17. In a fluid operated drill of the character disclosed, a fluid operated motor, fluid operated feed means therefor, spring return means for said feed means, and means for controlling said feed means comprising a main valve for admitting fluid to said motor and said feed means, a rate-of-flow valve for controlling the rate of fluid to said feed means, a one-way valve having an inlet connected with said feed means, and a selector valve having communication with said main valve, said rate-of-flow valve and said one-way valve when in one position, and when in a second position blocking off communication with said main valve.

References Cited in the file of this patent

UNITED STATES PATENTS

| | | |
|---|---|---|
| 1,912,184 | Ferris et al. | May 30, 1933 |
| 2,153,637 | Niven | Apr. 11, 1939 |
| 2,167,623 | Britter | Aug. 1, 1939 |
| 2,285,069 | Vickers | June 2, 1942 |
| 2,406,482 | Tucker | Aug. 27, 1946 |
| 2,585,297 | Beuscher | Feb. 12, 1952 |
| 2,604,759 | Smith | July 29, 1952 |
| 2,633,709 | Dales | Apr. 7, 1953 |
| 2,637,353 | Hyslop | May 5, 1953 |
| 2,657,595 | Shaff | Nov. 3, 1953 |
| 2,674,098 | Taylor | Apr. 6, 1954 |
| 2,750,816 | Mott | June 19, 1956 |
| 2,811,877 | DeGroff | Nov. 5, 1957 |

FOREIGN PATENTS

| | | |
|---|---|---|
| 695,282 | Great Britain | Aug. 5, 1953 |